United States Patent [19]

Hernandez

[11] Patent Number: 4,776,797
[45] Date of Patent: Oct. 11, 1988

[54] COIN CUE DEVICE AND METHOD FOR AIDING THE HANDICAPPED

[76] Inventor: JoAnn Hernandez, 300 E. 3rd, Cherryvale, Kans. 67335

[21] Appl. No.: 44,465

[22] Filed: May 1, 1987

[51] Int. Cl.⁴ .................. A45C 11/00; B65D 73/00; G09B 21/00
[52] U.S. Cl. .................................. 434/110; 434/113; 206/0.81; 206/0.84; 206/459; 206/457; 40/323; 40/336
[58] Field of Search .............. 206/0.8, 0.81, 0.82, 206/0.83, 0.84, 457, 459; 116/205, DIG. 17; 40/323, 333, 336, 339, 27.5; 434/110, 113, 202, 203

[56] References Cited

U.S. PATENT DOCUMENTS

| | | | |
|---|---|---|---|
| 2,654,164 | 10/1953 | Seidenberg | 434/203 |
| 3,047,144 | 7/1962 | Wissel | 206/0.83 |
| 3,488,864 | 1/1970 | Mc Manus | 229/92.9 X |
| 3,579,878 | 5/1971 | Griffin | 206/459 X |
| 3,861,678 | 1/1975 | Fansler | 206/0.83 X |
| 3,968,583 | 7/1976 | Allam | 40/584 |
| 4,016,937 | 4/1977 | Abraham | 40/323 |
| 4,056,190 | 11/1977 | Dix | 206/457 X |
| 4,402,398 | 9/1983 | Smoczynski | 206/0.82 |
| 4,582,251 | 4/1986 | Odom, Jr. et al. | 434/113 X |

FOREIGN PATENT DOCUMENTS

| | | | |
|---|---|---|---|
| 1168206 | 5/1984 | Canada | 206/0.8 |
| 1014364 | 8/1957 | Fed. Rep. of Germany | 206/0.8 |
| 3319210 | 11/1984 | Fed. Rep. of Germany | 40/323 |
| 81586 | 4/1953 | Norway | 206/0.8 |

Primary Examiner—Stephen Marcus
Assistant Examiner—T. Graveline
Attorney, Agent, or Firm—John Wade Carpenter

[57] ABSTRACT

A coin cue device having a pliable support, a circular backing secured to the pliable support and elevated pictorial coin indicia integrally bound to the circular backing. A circular ridge is secured to the pliable support and to the circular backing, and a removable backing is removably secured to the back of the pliable support. A method for aiding the handicapped in determining which monetary coins are to be desposited in a machine.

10 Claims, 2 Drawing Sheets

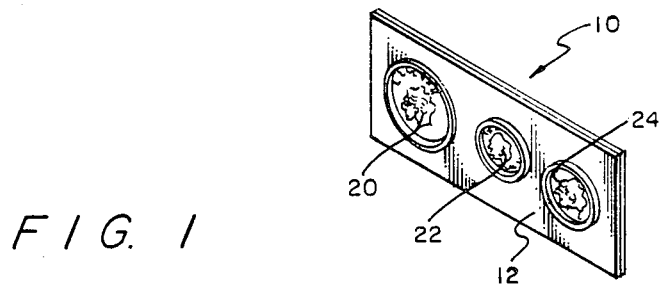
FIG. 1
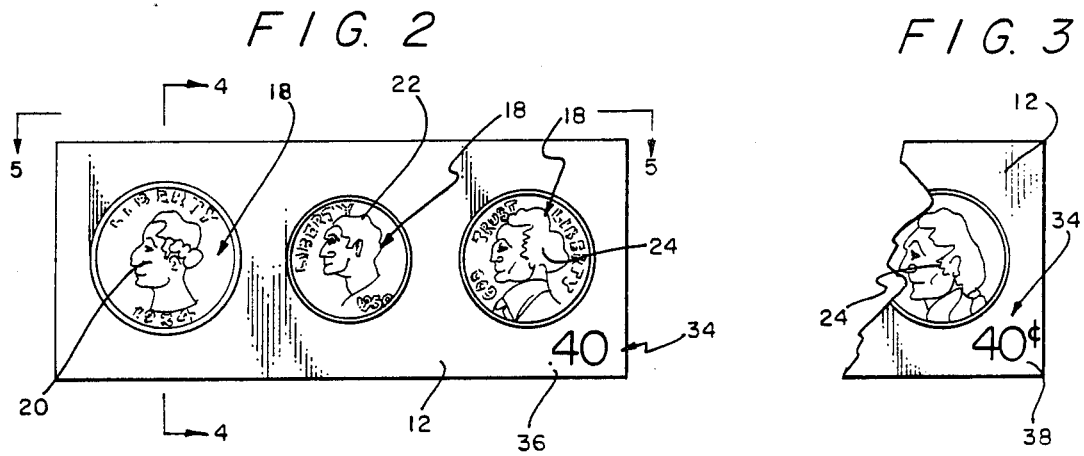
FIG. 2
FIG. 3
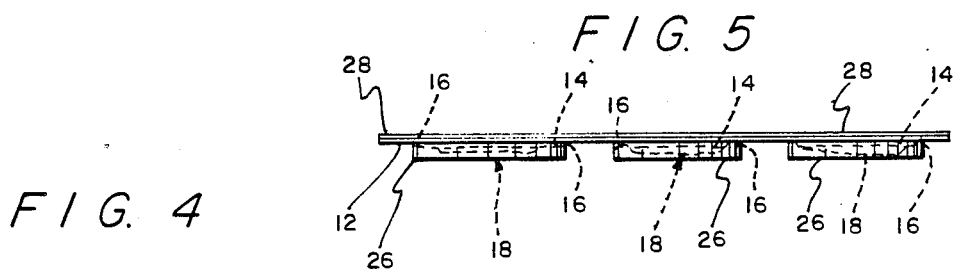
FIG. 5
FIG. 4
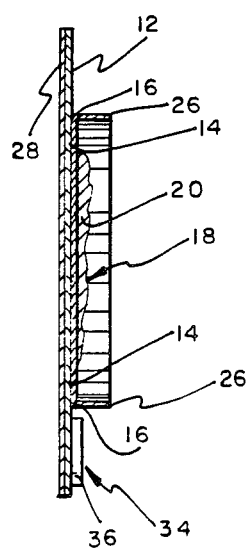
FIG. 6
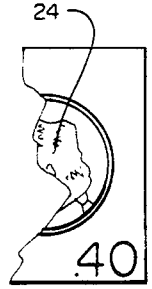
FIG. 7

COIN CUE DEVICE AND METHOD FOR AIDING THE HANDICAPPED

FIELD OF THE INVENTION

This invention relates to a coin cue device and to a method for aiding the handicapped in selecting the correct amount of monetary coin(s) for deposit into a machine.

DESCRIPTION OF THE PRIOR ART

U.S. Pat. No. 1,748,280 to De Veto discloses a coin rejecting shield for telephone coin boxes. U.S. Pat. No. 3,488,864 to McManus illustrates a device for teaching monetary skills. U.S. Pat. No. 3,968,583 depicts a numeric display for Arabic speaking people. U.S. Pat. No. 4,016,937 to Abraham teaches an appliance for coin-operated devices. None of the foregoing prior art teaches or suggests the particular coin cue device, or method for aiding the handicapped, of this invention.

SUMMARY OF THE INVENTION

This invention broadly accomplishes its desired objects by providing a coin cue device comprising
(a) a pliable support means;
(b) at least one circular backing means having a circular perimeter and secured to said pliable support means;
(c) elevated pictorial coin indicia integrally bound to said at least one circular backing means and projecting therefrom at a predetermined distance such as to be felt and distinguishable with human fingers, said elevated pictorial coin indicia representing a pictorial representation from a monetary coin of known value;
(d) a circular ridge secured to said pliable support means and to said circular perimeter of said circular backing means to encircle the latter and said elevated pictorial coin indicia integrally bound thereto, said circular ridge has a circumference slightly larger than said monetary coin of known value and extends above said elevated pictorial coin indicia at a distance such that the monetary coin of known value can fit snugly therein without interference from said elevated pictorial coin indicia but not so tightly as to prevent its easy removal; and
(e) a removable backing removably secured to the back of said pliable support means.

This invention further broadly accomplishes its desired objects by providing a method for aiding the handicapped in determining which monetary coins are to be deposited in a machine comprising the steps of:
(a) feeling at least one elevated pictorial coin indicia bound to at least one circular backing having a circular perimeter and extending from about 1/16 inch to about ¼ inch therebeyond for human pictorial representation of a monetary coin;
(b) finding a monetary coin having the same human pictorial representation felt in step (a);
(c) positioning snugly the monetary coin of step
(b) within a circular ridge secured to a pliable support means and to the circular perimeter of the circular backing wherein the circular ridge extends from about ⅜ inch to about ⅝ inch from said circular backing means and has a circumference slightly larger than the monetary coin such that the monetary coin can fit snugly therein without interference from the elevated pictorial coin indicia but not so tightly as to prevent its easy removal;
(d) removing said monetary coin from within the circular ridge and depositing the same within a machine.

Therefore, it is an object of the present invention to provide a coin cue device.

It is another object of this invention to provide a method for aiding the handicapped in determining the correct monetary coins(s) to be deposited into a machine.

These, together with various ancillary objects and features which will become apparent to those skilled in the art as the following description proceeds, are attained by this apparatus and process, a preferred embodiment being shown with reference to the accompanying drawing, by way of example only, wherein:

BRIEF DESCRIPTION OF THE DRAWINGS

FIG. 1 is a perspective view of the coin cue device of this invention;

FIG. 2 is a top plan view of the coin cue device;

FIG. 3 is a segmented part of the coin cue device;

FIG. 4 is a vertical sectional view taken in direction of the arrows and along the plane of line 4—4 in FIG. 2;

FIG. 5 is a top plan view taken in direction of the arrows and along the plane of line 5—5 in FIG. 2:

FIG. 6 is a perspective view of the back of the coin cue device showing the removable back partly removed from the pliable support means;

FIG. 7 is another partial segmented part of the coin cue device;

DETAILED DESCRIPTION OF THE INVENTION

Figure 8:
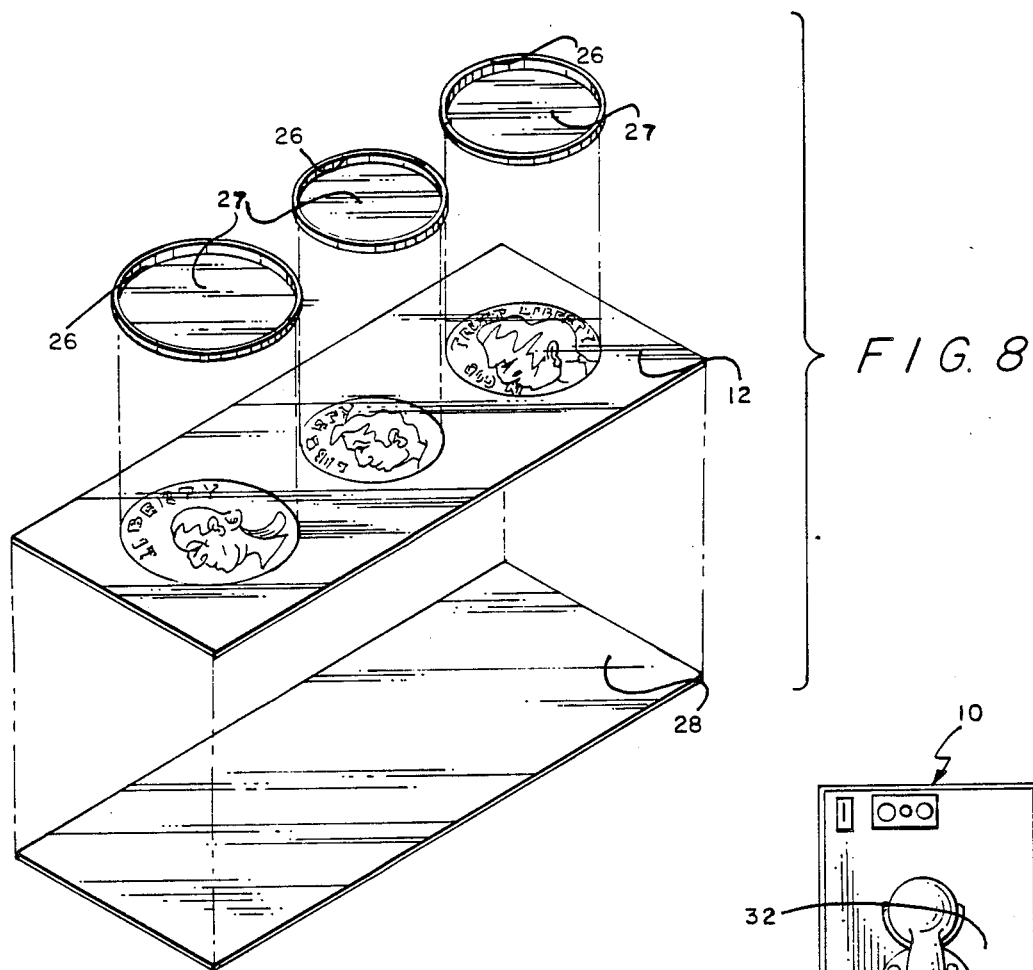
FIG. 8 is an exploded segmented perspective view of the coin cue device.
Figure 9:
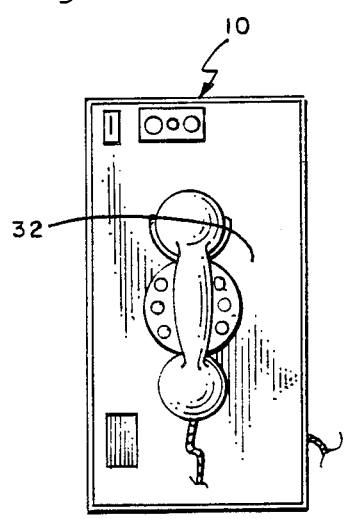
FIG. 9 is a front elevational view disclosing the coin cue device secured to a phone.

Referring in detail now to the drawings wherein similar parts of the invention are identified by like reference numerals, there is seen the coin cue device, generally illustrated as 10, having a pliable support means 12 (e.g. vinyl; polyethylene plastic, polypropylene plastic, acrylonitrile-butadiene-styrene, or the like). At least one circular backing 14 (see FIG. 4), which is preferably manufactured of the same material of the pliable support means 12, is secured to the pliable support means 12. Preferably, the coin cue device 10 comprises three circular backings 14-14-14 (see FIG. 5). Each circular backing 14 includes a circular perimeter 16 (see FIGS. 4 and 5).

An elevated pictorial coin indicia, generally illustrated as 18, is integrally bound to at least one of the circular backing 14 and projects therefrom at a predetermined distance, preferably from about 1/16 inch to about ¼ inch, such as to be felt and distinguishable with human fingers. The elevated pictorial coin indicial 18 represents a pictorial representation from a monetary coin of known value. For example, the elevated pictorial coin indicia 18 may be a picture 20 of Washington which is the same picture on a quarter and would be worth twenty-five cents. Similarly, the elevated pictorial coin indicia 18 may be a picture 22 of Roosevelt which is the same picture on a dime and would be worth ten cents. By way of example further, the elevated pictorial coin indicia 18 may be a picture 24 of Jefferson which is the same picture on a nickle and would be worth five cents. The summation of monetary coins having the pictorial coin indicia 18 of Washington, Roosevelt, and Jefferson is forty cents. While the pictorial coin indicia 18 has been represented as pictures of Washington, Jefferson, and Roosevelt, it is to be understood that the pictorial coin indicia 18 may be any pictures or representation from any monetary coin of known value.

A circular ridge 26, which may include a transparent shield 27 (as illustrated in FIG. 8) to cover and protect the pictorial representation indicia 18, is secured to the pliable support means 12 and to each of the circular perimeter 16 of the circular backing 14 to encircle the circular backing 14 and the elevated pictorial coin indicia 18 integrally bound thereto. As illustrated, the circular ridge 26 has a circumference that is slightly larger than a monetary coin of known value and extends above the elevated pictorial coin indicia 18 at a distance, preferably from about ⅛ inch to about ⅜ inch, such that the monetary coin of known value can fit snugly therein without interference from the elevated pictorial coin indicia 18 but not so tightly as to prevent its easy removal.

Figure 10:
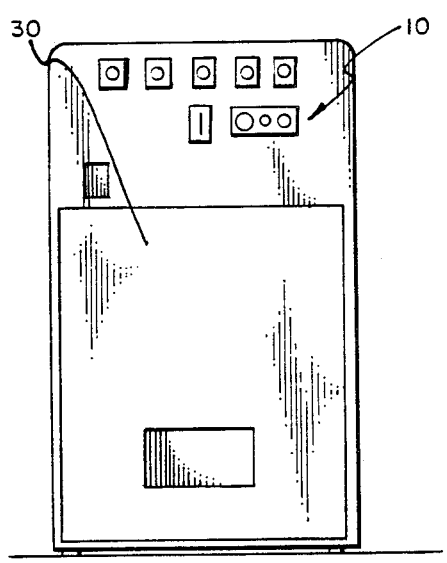
FIG. 10 is a front elevational view disclosing the coin cue device secured to a vending machine.

A removable backing 28 is removably secured to the back of the pliable support means 12 by an adhesive means which may be any suitable adhesive that releases the removable backing 28 while still possessing adhesive power after the backing 28 is removed such that the pliable support means 12 may be stuck or adhered to a machine, such as vending machine 30 in FIG. 10 or phone 32 in FIG. 11, or any support surface.

The coin cue device 10 preferably additionally comprises elevated numerical indicia, generally illustrated as 34, secured to the pliable support means 12 and extending from about 1/16 inch to about ¼ inch beyond the pliable support means 12. The elevated numerical indicia 34 equals in monetary representation the summation of the value of the monetary coins of known value and having pictorial representations that are represented by the elevated pictorial coin indicia 18. By way of example only, when the pictorial coin indicia 18 is respectively Washington, Roosevelt and Jefferson, as illustrated in FIG. 2, the elevated numerical indicia 34 would be forty cents, represented as "0.40" in FIG. 2 and "40¢" in FIG. 3. For the elevated numerical indicia 34 represented as "0.40" in FIG. 2, the decimal, indicated as 36, protrudes from the pliable support means 12, say 1/32 inch to ¼ inch. Similarly, for the elevated numerical indicia 34 represented as "40¢" in FIG. 3, the cent sign, indicated as 38, protrudes from the pliable support means 12, say 1/32 inch to ¼ inch also.

With continuing reference to the drawing for operation of the invention and the method for aiding the handicapped in determining which monetary coins are to be deposited in a machine (e.g. vending machine 30 or phone 32), the handicapped, such as a blind person, initially feels with their fingers the elevated pictorial coin indicia 18 for human pictorial representation of a monetary coin (e.g. a quarter, a dime, and a nickel as illustrated in FIG. 2). Alternatively, instead of feeling (or in combination with feeling) the elevated pictorial coin indicia 18, the handicapped (if they can see) may view or look at elevated pictorial coin indicia 18 for the human pictorial representation of a particular monetary coin having the same human pictorial representations.

After feeling and/or seeing the human pictorial representation, the handicapped person finds and holds monetary coin(s) having the same human pictorial representation felt and/or seen. The monetary coin(s) found and held are positioned snugly within the circular ridge 26 in order to double check and insure that the correct monetary coin(s) is/are found. The monetary coin(s) is/are subsequently removed from within the circular ridge 26 and deposited into a slot of the vending machine 30 or the phone 32, or any other machine. In order to further double check and insure that the correct monetary coin(s) is/are being utilized, certain of the handicapped may see or feel, or see in combination with feeling, the elevated numerical indicia 34 to check and insure that the elevated numerical indicia 34 equals in monetary representation the summation of the value of the monetary coin(s) found and held for eventual deposit into a machine.

The elevated pictorial coin indicia 18 of this invention is made of realistic pictures so as to enable the mentally retarded, the uneducated, small children, and/or other people in the general population to select the exact coins and/or correct change for machine purchases. With the elevated circular ridge 26 of this invention, various blind and poor sighted individuals/population will be able to use the device 10 with ease. They shall be able to feel the size of the underlying coin so as to insert the correct amount of change and/or know the value of the desired machine item without seeking assistance. Larger value coins will be preferably placed first and coins of least value preferably placed last in a left to right sequence.

The coin cue device 10 of this invention can also be used on vending machines 30 or phone 32 in the foreign market where tourists are at a disadvantage in identifying foreign money values and must rely on a stranger's honesty in making a simple purchase. It should be understood that the coin cue device 10 should be placed at the top of, or in very close proximity of the coin slot to assure maximum success. This close placement will provide another very important cue for the visually handicapped—one of where to deposit the money. Also, regularly routed servicemen will be able to administer the coin cue device 10 with minimal effort, as the pliable support means 12 will be self-adhesive on the backside. The regular serviceman will also be able to keep the monetary value current for the machine by simply applying a new money strip whenever necessary.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

What is claimed is:

1. A method for aiding the handicapped in determining which monetary coins are to be deposited in a machine comprising the steps of:
   (a) feeling at least one elevated pictorial coin indicia bound to at least one circular backing having a circular perimeter and extending from about 1/16 inch to about ¼ inch therebeyond for human pictorial representation of a monetary coin;
   (b) finding a monetary coin having the same human pictorial representation felt in step (a); (c) positioning snugly the monetary coin of step (b) within a circular ridge secured to a pliable support means and to the circular perimeter of the circular backing wherein the circular ridge extends from about ⅛ inch to about ⅜ inch from said circular backing means and has a circumference slightly larger than the monetary coin such that the monetary coin can fit snugly therein without interference from the elevated pictorial coin indicia but not so tightly as to prevent its easy removal;

(d) removing said monetary coin from within the circular ridge and depositing the same within a machine.

2. The method of claim 1 additionally comprising feeling elevated numerical indicia secured to said pliable support means and extending therefrom from about 1/16 inch to about ¼ inch, said numerical indicia equaling in monetary representation the summation of the value of the monetary coin.

3. A coin cue device comprising
(a) a pliable support means;
(b) at least one circular backing means having a circular perimeter and secured to said pliable support means;
(c) elevated pictorial coin indicia integrally bound to said at least one circular backing means and projecting therefrom at a predetermined distance such as to be felt and distinguishable with human fingers, said elevated pictorial coin indicia representing a pictorial representation from a monetary coin of known value;
(d) a circular ridge secured to said pliable support means and to said circular perimeter of said circular backing means to encircle the latter and said elevated pictorial coin indicia integrally bound thereto, said circular ridge has a circumference slightly larger than said monetary coin of known value and extends above said elevated pictorial coin indicia at a distance such that the monetary coin of known value can fit snugly therein without interference from said elevated pictorial coin indicia but not so tightly as to prevent its easy removal; and (e) a removable backing removably secured to the back of said pliable support means.

4. The coin cue device of claim 3 wherein said pictorial coin indicia extends from about 1/16 inch to about ¼ inch beyond said circular backing means.

5. The coin cue device of claim 4 wherein said circular ridge extends from about ⅛ inch to about ⅜ inch beyond said circular backing means.

6. The coin cue device of claim 5 additionally comprising an adhesive means bound to said pliable support means such that said coin cue device may be secured to a support surface after the removable backing is recovered.

7. The coin cue device of claim 6 additionally comprising elevated numerical indicia secured to said pliable support means and extending from about 1/16 inch to about ¼ inch beyond said pliable support means, said numerical indicia equaling in monetary representation the summation of the value of the monetary coin of known value and having pictorial representation that are represented by the elevated pictorial coin indicia.

8. The coin cue device of claim 7 wherein said elevated numerical indicia comprises a protruding symbol for a cent sign.

9. The coin cue device of claim 7 wherein said elevated numerical indicia comprises a protruding symbol for a decimal.

10. The coin cue device of claim 7 additionally comprising a transparent shield secured to said circular ridge.

* * * * *